United States Patent [19]

Quenneville et al.

[11] 4,251,051
[45] Feb. 17, 1981

[54] SOLENOID STRUCTURE HAVING A RELATIVELY UNRESTRAINED GENERALLY FLAT ARMATURE MEMBER

[75] Inventors: Raymond N. Quenneville, Suffield; Dennis R. Custer, West Granby, both of Conn.

[73] Assignee: The Jacobs Manufacturing Company, Bloomfield, Conn.

[21] Appl. No.: 31,411

[22] Filed: Apr. 19, 1979

[51] Int. Cl.³ ............................................. F16K 31/02
[52] U.S. Cl. ...................................... 251/129; 335/82; 335/262
[58] Field of Search ................ 251/129; 335/81, 82, 335/249, 255, 258, 262, 279

[56] References Cited

U.S. PATENT DOCUMENTS

| | | | |
|---|---|---|---|
| 1,333,681 | 3/1920 | Riley | 251/129 |
| 2,765,808 | 10/1965 | Tydeman | 251/129 |
| 3,250,293 | 5/1966 | Adams et al. | 251/129 |
| 3,325,139 | 6/1967 | Diener et al. | 251/129 |
| 3,422,850 | 1/1969 | Caldwell | 251/129 |
| 3,523,556 | 8/1970 | Worrall | 251/129 |
| 3,751,001 | 8/1973 | Rayment | 251/129 |

Primary Examiner—Harold Broome
Attorney, Agent, or Firm—Donald E. Degling

[57] ABSTRACT

An improved solenoid adapted for use in a solenoid actuated valve or switch is disclosed. Increased speed of operation and increased capacity result from the incorporation of a plate or disc type of armature which is relatively unrestrained with respect to the actuating mechanism for the valve or switch device to be operated thereby, whereby the effective air gap in the magnetic circuit may be substantially reduced.

24 Claims, 12 Drawing Figures

SOLENOID STRUCTURE HAVING A RELATIVELY UNRESTRAINED GENERALLY FLAT ARMATURE MEMBER

BACKGROUND OF THE INVENTION

1. Field of the Invention

This invention relates generally to the field of solenoids and solenoid actuated valves. More specifically, it relates to a solenoid of improved construction which has increased pulling capacity compared with prior art solenoid constructions.

2. Prior Art

Solenoids and solenoid actuated valves are well-known in the art. Typically the solenoid comprises a helically wound coil of insulated wire capable of inducing a directionalized magnetic field when an electric current flows through the coil. The solenoid may be equipped with a movable plunger in the form of an iron rod or bar designed for axial movement with respect to the coil.

The force or pull which may be exerted by the solenoid is a function of the current in the coil once the core has become saturated. Prior to saturation, force or pull is proportional to the square of the exciting current. In general, the force or pull of a solenoid may be increased using an ironclad solenoid so as to provide an iron return path for the magnetic flux. As a corollary, it is well-known that as the air gaps in the magnetic circuit decrease the force or pulling power of the solenoid increases. Thus, in the conventional plunger type solenoid, as the plunger or armature moves axially into the coil, the air gap in the magnetic circuit decreases and the force or pull of the solenoid increases.

Typically, the solenoid and armature will have both a primary and a secondary air gap. These gaps will usually be found at opposite ends of the armature and will be of the same magnitude since the solenoid is ordinarily designed to provide essentially no air gap in the fully energized state. The useful travel of the armature is thus equal to approximately half of the total initial air gap.

In place of the plunger type of armature referred to above, the armature may be mounted on a rod or bar which, in turn, is journalled for reciprocating movement within the solenoid coil as shown in U.S. Pat. Nos. 2,765,808 and 3,250,293. Such movement may be resisted by frictional forces caused by the side thrust of the armature or the plunger bar which is drawn against the inside surface of the solenoid coil by the magnetic field.

A modification of the plunger type of armature is shown in U.S. Pat. No. 1,333,681 where a cup-shaped armature restrained to move only in an axial direction acts upon a rod passing through the solenoid coil. A further modification of the plunger type of armature appears in U.S. Pat. No. 3,325,139 wherein the armature has a tapered or conical shape and moves axially into a mating portion of the core piece. A sliding annular armature constrained to move in an axial direction is shown in U.S. Pat. Nos. 3,422,850 and 3,523,556. A pivotally-mounted, spring-loaded armature functioning as a valve disc is shown in U.S. Pat. No. 3,751,001. The armature or valve disc is restrained by the pivotal mounting to an oscillation or oscillatory motion about the pivot mounting.

SUMMARY OF THE INVENTION

A principal object of the present invention is to provide a simple and easily manufactured solenoid or solenoid valve which is capable of very fast response and has increased force or pulling capacity. Another object of the present invention is to eliminate the effects of side thrust of the armature so as to minimize the frictional losses which may occur within the solenoid structure. A further object of the present invention is to eliminate one of the air gaps in the magnetic circuit whereby the pull of the armature is substantially increased.

These and other objects are accomplished in applicants' novel solenoid structure wherein the reciprocable armature is replaced by a relatively unrestrained magnetically permeable, generally flat armature member preferably in the form of a disc. The armature member may be unitary or it may be split. The armature member may constitute a part of a valve or may directly or indirectly actuate a valve member. Where the armature member indirectly actuates a valve member, it may do so through a pin which may preferably be made from non-magnetic material or material of relatively low permeability. The solenoid of the present invention may include an integral body and valve portion or it may cooperate with an external valve mechanism. Additionally, a portion of the magnetic circuit may be provided by the equipment with which the solenoid is used thereby decreasing both the size and the cost of the solenoid device.

DESCRIPTION OF THE DRAWINGS

Additional advantages of the novel combination according to the present invention will become apparent from the following detailed description of the invention and the accompanying drawings in which.

DETAILED DESCRIPTION OF THE INVENTION

Figure 1:
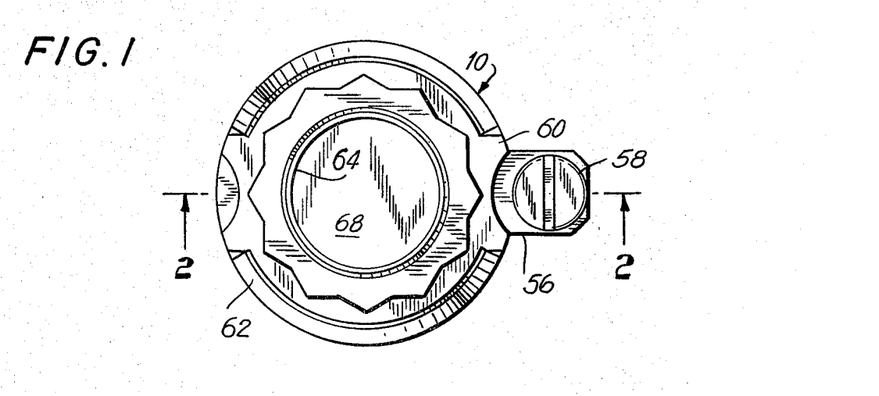
FIG. 1 is a top plan view of an improved solenoid valve according to the present invention.
Figure 2:
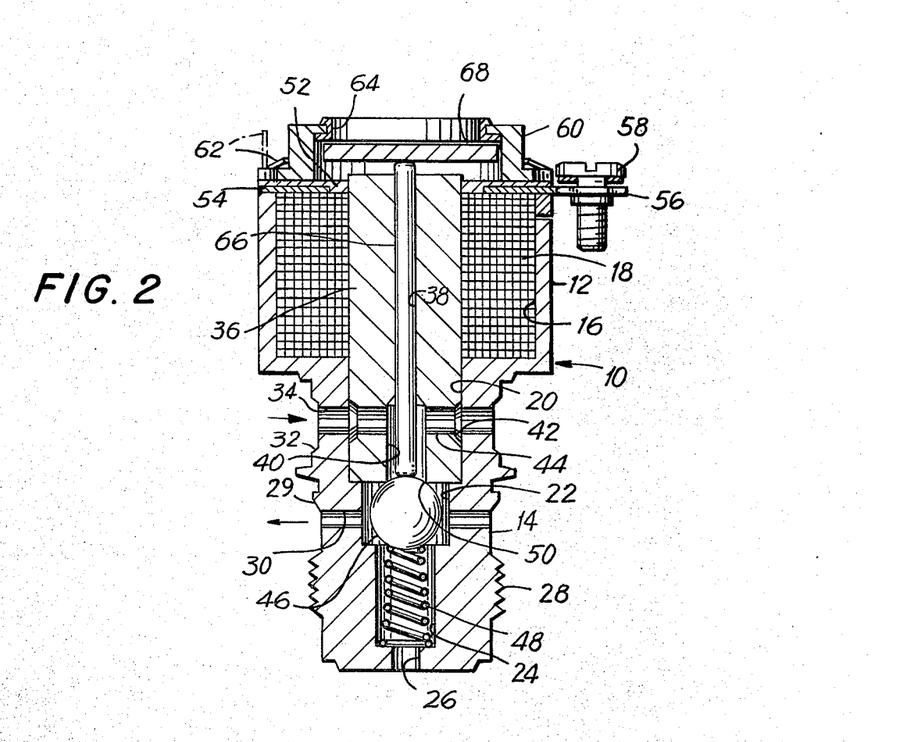
FIG. 2 is a cross-sectional view of the solenoid valve taken along line 2—2 of FIG. 1.

Referring first to FIGS. 1 and 2, the solenoid valve body is indicated generally by the numeral 10 and comprises an upper solenoid portion 12 and a lower valve portion 14. The valve body 10 is symmetrical about its axis and is made from a magnetic material so as to be capable of functioning as part of a magnetic circuit. Preferably, the body 10 is formed with five concentric and communicating bores. At the top, the largest bore is the solenoid bore 16 which is adapted to receive the solenoid coil 18. A second and smaller sleeve bore 20 is positioned concentrically between the solenoid bore 16 and a ball valve bore 22. The fourth and still smaller spring bore 24 communicates between the ball valve bore 22 and a relief aperture 26.

The valve portion 14 of the body 10 has threads 28 formed exteriorly thereon to facilitate the attachment of the solenoid valve to a machine (not shown) or other device with which the valve may be used. It will be understood that appropriate gaskets, washers or O-ring seals (not shown) may also be employed. An annular groove 29 is formed on the outer surface of the valve portion 14 and a diametral passageway 30 communicates between the annular groove 29 and the ball valve bore 22. A second annular groove 32 is formed in the valve portion 14 of the solenoid body 10 and communicates through a second diametral passageway 34 with the sleeve bore 20. The annular groove 32 may, for example, communicate with a source of fluid, such as oil, under pressure while the annular groove 29 communicates with a device requiring a supply of pressurized fluid.

A sleeve 36 made from a magnetic material is press fitted into the sleeve bore 20, or otherwise closely fitted to the sleeve bore 20, and extends upwardly to a point near the top of the solenoid body 10. The sleeve 36 is provided with an axial bore 38 which contains an enlarged region 40 at the lower end thereof. An annular groove 42 is formed on the outside surface of the sleeve 36 so as to register with the diametral passageway 34 and a diametral passageway 44 communicates between the annular groove 42 and the enlarged region 40 of the axial bore 38.

A ball valve 46 is located in the ball valve bore 22 and biased by a spring 48 against a seat 50 formed in the lower end of the sleeve 36 by the enlarged region 40 of the axial bore 38. The spring 48 is seated in the spring bore 24.

The solenoid coil 18 may be sealed into the solenoid portion 12 of the solenoid body 10 by appropriate potting material 52. One terminal 54 of the solenoid coil 18 may be connected electrically to the solenoid portion 12 of the solenoid body 10 which, in this event, would be appropriately grounded, while the other terminal 56 of the solenoid coil 18 carries a screw 58 to connect the solenoid coil 18 to an appropriate electrical circuit (not shown). Of course, external terminals for both ends of the solenoid coil may also be provided.

An annular cap 60 made from a magnetic material is affixed to the solenoid portion 12 of the body 10, for example, by crimping a thin wall portion 62 of the body 10 over the rim of the cap 60. The thin wall portion 62 thus provides a magnetic circuit means to interconnect the annular cap 60 and the solenoid portion 12 of the body 10 which, in turn, is in magnetic connection with the sleeve 36. The upper portion of the cap 60 is preferably star shaped and is adapted to be engaged by a standard 12-point socket wrench to facilitate tightening of the solenoid body 10 into a threaded seat (not shown). Of course, the cap 60 may be designed to be engaged by other types of spanner wrenches or equivalent tightening means may be formed on the exterior surface of the solenoid portion 12 of the body 10. Preferably an insert 64 made from a non-magnetic material is fitted into the annular cap 60. While the insert 64 is illustrated in FIG. 2 as having a large central orifice, it may be desirable to reduce the size of the orifice to inhibit the introduction of foreign material into the armature chamber or to eliminate the orifice if no venting is desired. A drive pin 66, preferably formed from a non-magnetic material, is mounted for reciprocating movement within the axial bore 38 of the sleeve 36 and is of such length as to contact the ball valve 46 at its lower end and an armature member 68 at its upper end. When the ball valve 46 is in contact with its seat 50, the drive pin 66 pushes the armature member 68 upwardly and closely adjacent to the lower surface of the insert 64. It will be understood that the drive pin 66 is not affixed to either the ball valve 46 or the armature member 68.

The armature member 68 is made from a magnetic material and is slightly smaller than the inside dimension of the annular cap 60. As shown in FIGS. 1 and 2, the armature member 68 is, preferably, disc shaped and loosely located in the annular cap 60. It will thus be apparent that the armature member 68 is freely moveable, i.e. relatively unrestrained, and may have components of motion with respect to the drive pin 66 which comprise translation or rotation or both. In order to accomplish this motion, the maximum dimension of the armature must be less than the inside dimension of the armature chamber, but the precise amount of the lateral clearance is not critical.

Referring particularly to FIG. 2, the magnetic circuit includes the solenoid portion 12 of the body 10, the thin wall portion 62 of the body 10, the sleeve 36, the armature member 68 and the annular cap 60. In this circuit, two air gaps are present initially: (1) the annular gap between the armature member 68 and the annular cap 60 and (2) the gap between the armature member 68 and the sleeve 36. However, immediately upon passage of a current through the coil 18, the resulting magnetic field will exert a force on the armature member 68 which will cause it to slide relative to the drive pin 66 until contact is made between the armature member 68 and a point on the internal periphery of the cap 60. Of course, the armature member 68 may fortuitously already be in contact with the internal periphery of the cap 60. In either event, the practical effect is that the magnetic circuit effectively contains only a single air gap—the gap between the armature member 68 and the sleeve 36.

Figure 3A:
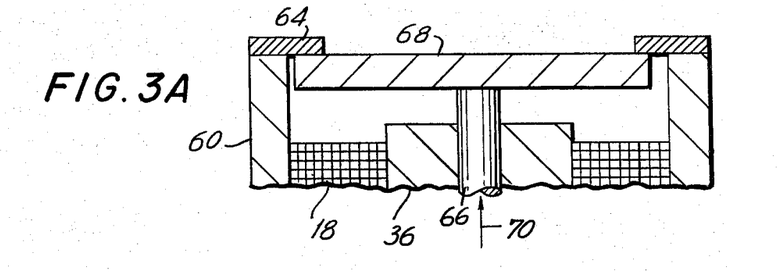
FIGS. 3A-3D are a series of fragmentary cross-sectional views showing the initial position, two intermediate positions, and the final position of the armature of the solenoid according to the present invention.
Figure 3B:
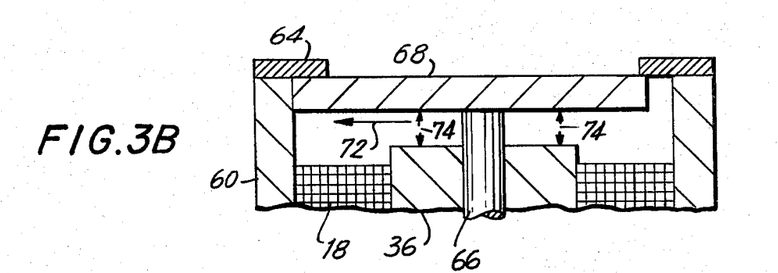

Reference is now made to FIGS. 3A-3D which show, schematically, the movement of the armature member 68 and drive pin 66 when electrical current is caused to flow in the coil 18. FIG. 3A represents the general condition of the armature member 68 when no current is flowing in the coil 18. Under this condition, the spring 48 will urge the ball valve 46 against its seat 50 and push the drive pin 66 upwardly. If pressurized hydraulic fluid is present above the ball valve 46 in the regions identified by the numerals 32, 34, 40, 42 and 44, (in FIG. 2), fluid pressure will also act on the end of the drive pin 66 forcing it upwardly until the drive pin 66 holds the armature member 68 against the insert 64 as suggested by the arrow 70 in FIG. 3A. As soon as current begins to flow in the coil 18, a magnetic field will be established which will exert a force on the lightweight armature member 68. Since the annular gap between the armature member 68 and the cap 60 will, in general, not be uniform, the armature member will first move in the direction where the smallest gap exists since, at this point, the force across the gap is at a maximum. This initial motion is indicated by the arrow 72 in FIG. 3B and the remaining air gap is indicated by the dimension 74 in FIG. 3B.

Figure 3C:
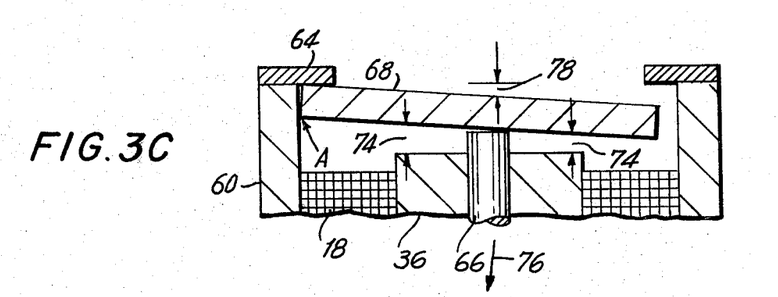
Figure 3D:
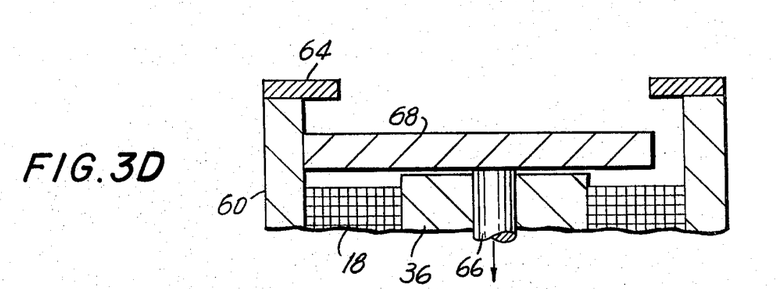

As shown in FIG. 3C, the force across the air gap between the sleeve 36 and the armature member 68 tends to cause the armature member to pivot about the point A so as to provide a lever action which will begin to force the drive pin 66 to move in a downwardly direction as indicated by the arrow 76 and the dimension 78. The air gap 74 between the armature member 68 and the sleeve will become uneven with the force tending to pivot the armature member increasing. It will be appreciated that the lever action referred to above will increase the force on the pin 66 which tends to open the ball valve 46.

Ultimately, the gap 74 will be substantially closed as the drive pin 66 reaches the limit of its travel. At this point, the gap may be on the order of 0.010 inch.

It will be appreciated that the initial movement of the armature member 68 which eliminates the gap between the armature member and the cap 60 occurs under almost frictionless conditions and therefore is accomplished very quickly. Thus, the actual amount or dimension of this first gap is of no great significance. The pivotal motion of the armature member begins immediately thereafter when the initial double air gap has been eliminated. As the clearances in the mechanical system must first be taken up, the ensuing pivoted motion produces first an impact effect and then a lever action which produces a mechanical advantage in driving the pin 66 downwardly. The mechanical advantage is developed in part because the resultant of the force produced by the magnetic field in the air gap is further from the pivot point than is the axis of the drive pin 66. The location of the resultant force is, of course, caused by the increased flux density associated with the narrower portion of the air gap 74.

Figure 4:
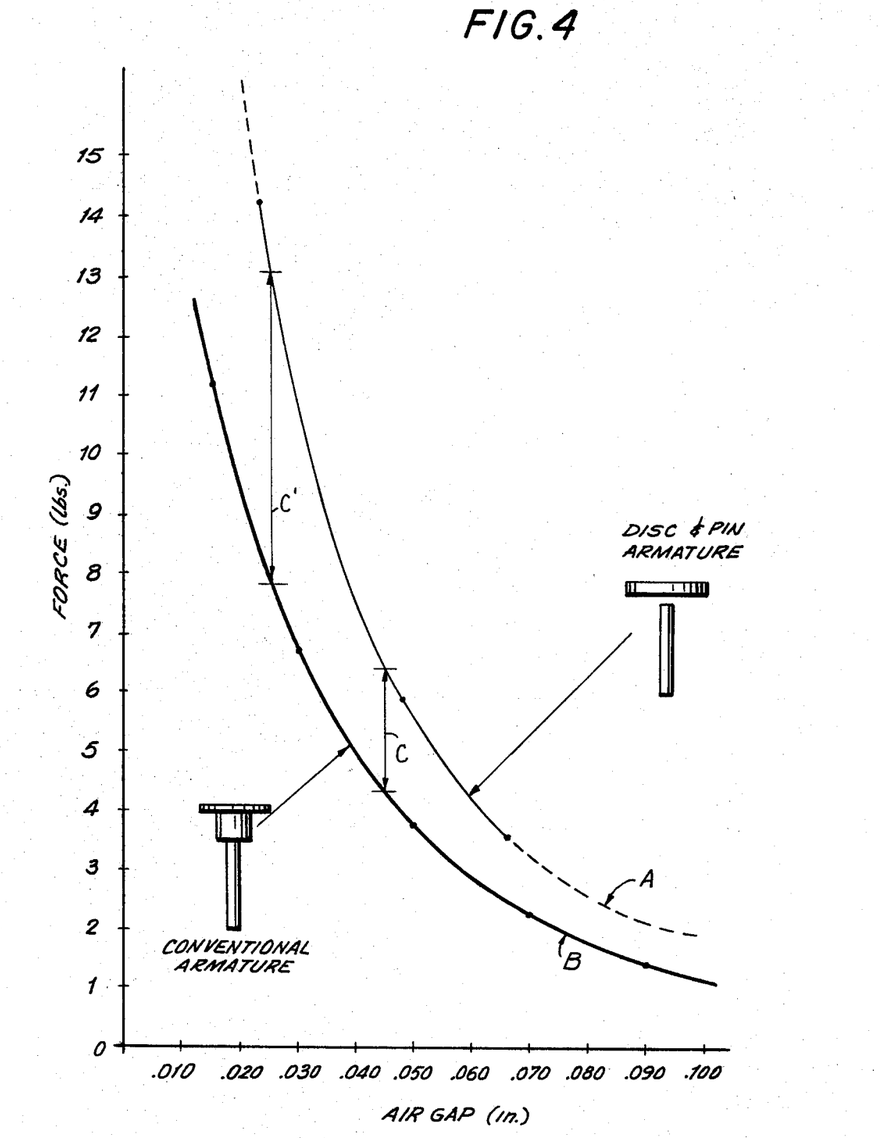
FIG. 4 is a graph showing the improved performance of the solenoid of the present invention in comparison with the prior art solenoid.

The operation of the solenoid according to the present invention in comparison with typical prior solenoids is shown in FIG. 4. In the tests represented by FIG. 4, identical solenoid coils were utilized. The coil data is shown in Table 1 below:

TABLE 1

| Temperature | 75° F. |
| Turns | 793 |
| Resistance | 11.15 ohms |
| Wire Size | @28 (copper) |
| Power | 12.9 Watts |
| Voltage | 12 Volts (d.c.) |

The curves of FIG. 4 show the force developed by each solenoid as a function of the air gap 74. As the solenoid coils used in the test were identical, the improved performance as measured, for example, by the vertical distances C, C' is necessarily due to the novel design of applicant's armature which enables the solenoid to function in a new and improved manner.

It has been noted above that the initial sliding motion of the armature member occurs under substantially frictionless conditions and the initial pivoting action also requires very little force as this motion occurs while the clearance in the system is being taken up. Thus, while the air gap is at its maximum, the required operating forces are at a minimum so that the solenoid according to the present invention is a rapid acting device. These characteristics are of particular significance. First, since the initial motion requires little force, the tolerance on the dimensions of the armature member and pin and the free travel of the armature member and pin are not critical and therefore the cost of the solenoid may be minimized. Second, the high speed characteristic of the solenoid according to the present invention fits it for use in devices such as a compression relief engine brake where fast and reliable solenoid operation is required.

Figure 8:
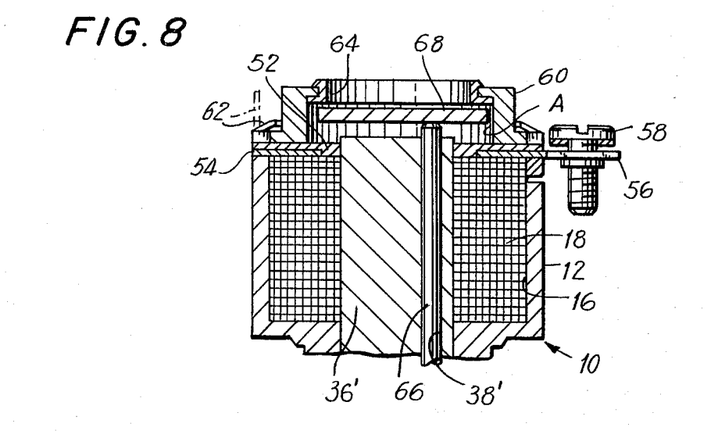
FIG. 8 is a modification of the solenoid valve shown in FIG. 2 wherein the actuating pin is offset from the axis of the solenoid.

It is to be understood that a number of variations are possible within the scope of the invention. Thus, while it is convenient to use an axially symmetric solenoid with a round armature in the form of a disc and an axial pin, it is possible to make the armature member or coil or both in an elliptical or rectangular shape, and the drive pin may be offset from the solenoid axis. Indeed, if it is desired to increase the solenoid force at the expense of reduced travel, the pin 66 may be offset from the axis as shown in FIG. 8. Parts common to FIGS. 2 and 8 are shown by the same designators while modified parts are indicated by a prime. In this instance, only the sleeve member 36' need be modified by providing a bore 38' therein which is offset from the axis of the sleeve by the desired amount. With this modification, the longer overhanging portion of the armature member 68 will be drawn towards the coil 18 first so that the short dimension of the armature member 68 is adjacent the pivot point A. Thus, the pin 66 is located closer to the pivot point A and the mechanical advantage of the armature and pin linkage is increased.

Figure 9:
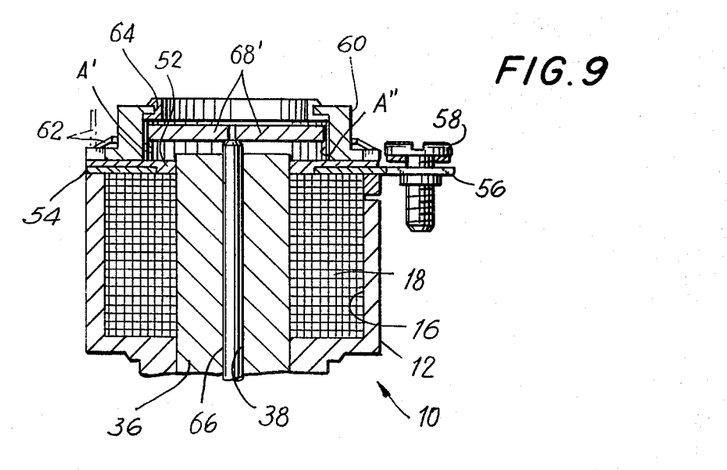
FIG. 9 is a further modification of the solenoid valve shown in FIG. 2 wherein the armature member is divided.

In addition to modifying the shape of the armature member and solenoid, it is possible to split the armature member, for example, along an axis of symmetry. This further modification is shown in FIG. 9 where, as in FIG. 8, parts common to FIGS. 2 and 9 are shown by the same designators while modified parts are indicated by a prime. In this modification, only the armature member 68' need be modified by dividing it, for example, along an axis of symmetry. In this form of the invention, the initial motion of the divided armature 68' will be towards the internal periphery of the annular cap 60 so as to establish pivot points A' and A". Thereafter, the divided armature 68' will act against the upper end of the pin 66 to drive it downwardly. Depending on the geometry and tolerances in the system, this type of modification may further decrease the initial air gap and, consequently, decrease the time within which the solenoid begins to act.

It will be understood that the improved, compact solenoid of the present invention can be further modified to operate various associated mechanisms. While it has been illustrated in conjunction with a ball valve in FIG. 2, the solenoid may be used with other types of hydraulic or pneumatic devices or to operate electrical switching mechanisms or microswitches. Examples of such further modifications are shown in FIGS. 5 through 7.

Figure 5:
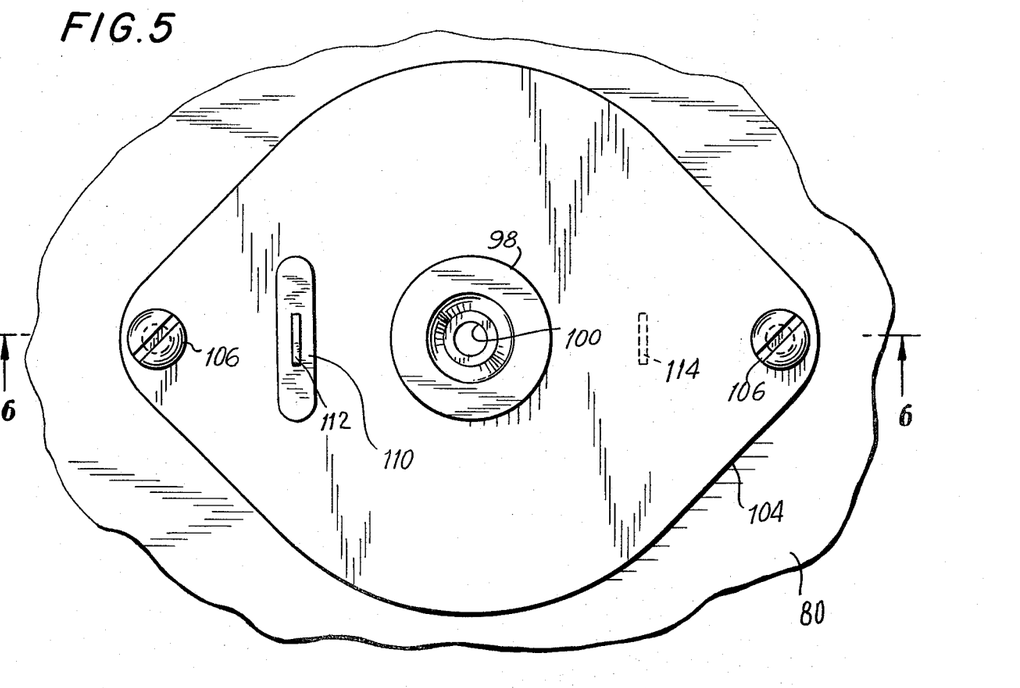
FIG. 5 is a top plan view of a modified form of a solenoid valve according to the present invention.
Figure 6:
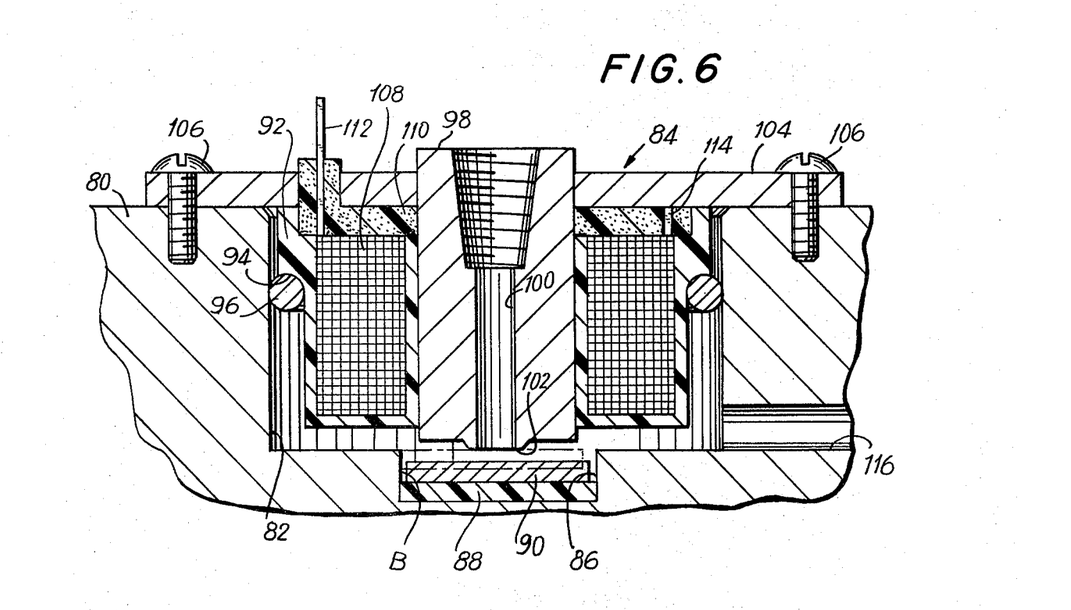
FIG. 6 is a cross-sectional view of the modified solenoid valve taken along lines 6—6 of FIG. 5.
Figure 7:
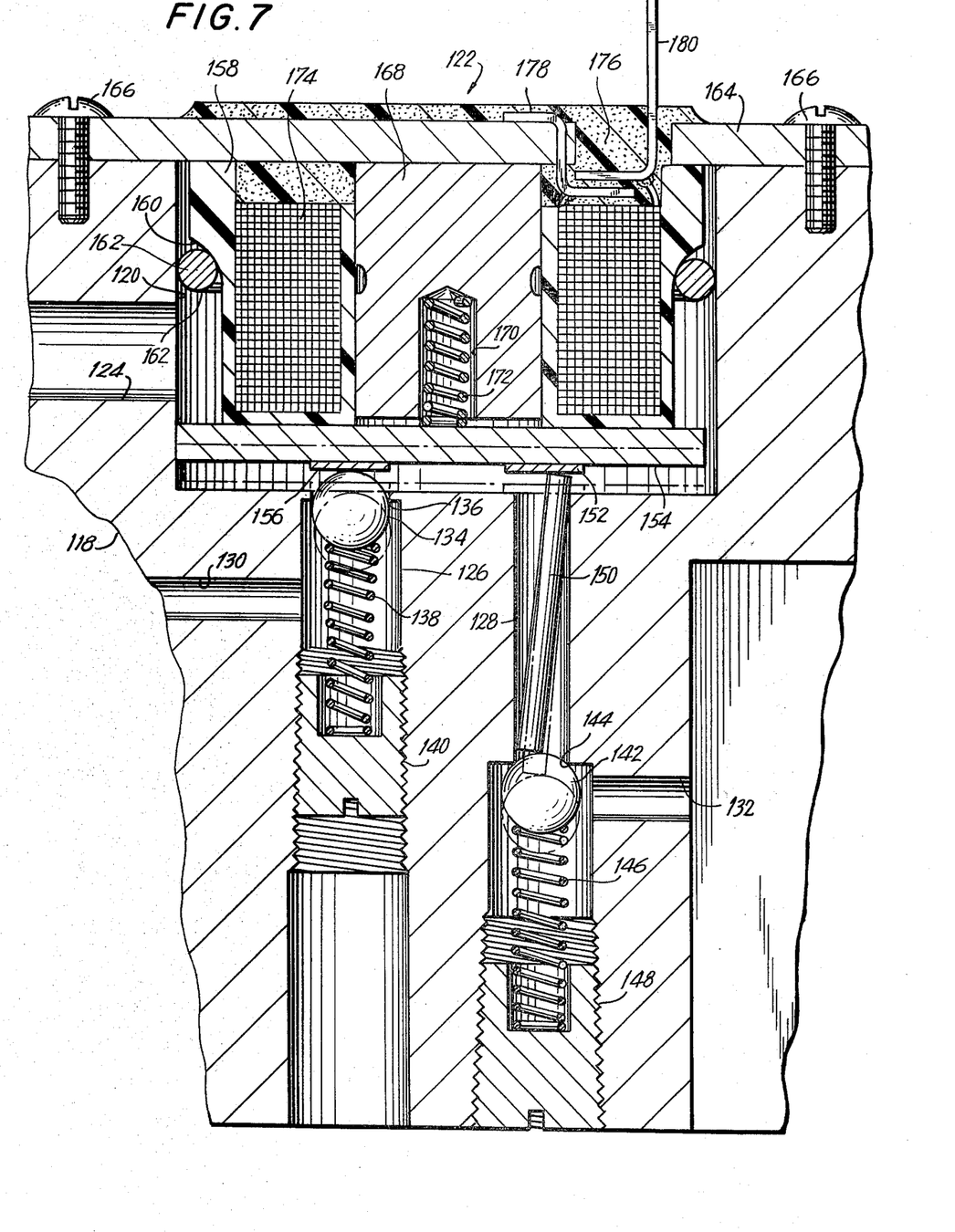
FIG. 7 is a cross-sectional view of a further modification of the solenoid valve according to the present invention.

Reference is now made to FIGS. 5 and 6 which illustrate a modification of the present invention to provide a combination of a solenoid and valve where the solenoid and valve is integral with the equipment with which it is employed.

The machine body 80 formed from a magnetic material has formed therein a bore 82 to accommodate the solenoid valve assembly 84. A somewhat smaller concentric bore 86 is also formed in the machine body 80 to receive, preferably, a pad or disc of non-magnetic material 88. The remainder of the bore 86 functions as an armature chamber and receives the relatively unrestrained armature member 90. It will be appreciated that the non-magnetic pad or disc 88 may, alternatively, be affixed to the armature member 90, if desired. While it is preferred to provide a disc of non-magnetic material 88, such a disc may be replaced by an air gap or may be omitted entirely. The armature member 90 is shown in solid lines in FIG. 6 in its unenergized condition while the phantom lines indicate the fully energized position. As shown in FIG. 6 the armature member 90 fits loosely or freely in the bore 86 so as to provide a small annular gap between the armature member 90 and the bore 86. It will be appreciated that the machine body 80 forms a portion of the magnetic circuit required for the action of the solenoid assembly 84. This requires that the machine body 80 be formed from a magnetic material. It will be understood that if the machine body 80 is formed from a non-magnetic material, such as aluminum, for example, an insert made from a magnetic material, such as iron, could be placed in the machine body 80 in the region of the solenoid assembly to meet the requirements of the magnetic circuit.

The solenoid assembly 84 comprises a cylindrical solenoid body portion 92 having a circumferential shoulder 94 to accommodate an O-ring seal 96 which provides a seal between the solenoid body 92 and the bore 82. A sleeve 98 is press fitted or otherwise joined to the solenoid body 92. The sleeve 98 is provided with an axial bore 100, the upper end of which may be tapped to form a connection for a fluid line (not shown). A valve seat 102 may be formed on the opposite or inner end of the sleeve 98. A plate 104 is fitted on the solenoid body 92 in magnetic contact with the sleeve 98 and is fastened to the machine body 80 by a plurality of fasteners 106 so as to complete the magnetic circuit between the sleeve member 98 and the machine body 80 and function as a magnetic circuit means.

A solenoid coil 108 is placed in the solenoid body 92 and sealed in place by appropriate potting material 110. One terminal 112 of the solenoid coil 108 extends upwardly through the potting material 110 while the other terminal 114 may be grounded to the plate 104. A passageway 116 in the machine body 80 communicates between the bore 82 and a portion of the machine (not shown) requiring an intermittent supply of fluid.

As shown in FIGS. 5 and 6, the solenoid valve of the present invention is normally open in the unenergized state and fluid entering the bore 100 may pass freely through the bore 100, the bore 82 and thence through the passageway 116. When electrical current is passed through the solenoid 108 a magnetic field is created in the magnetic circuit comprising the sleeve 98, the plate 104, the machine body 80 and the armature 90. Initially, as shown in FIG. 6, the magnetic circuit contains two air gaps: (1) the annular gap between the armature member 90 and the bore 86 and (2) the gap between the armature member 90 and the seat 102 on the sleeve 98. However, the first gap is closed quickly as the armature member 90 slides on the pad 88 until it contacts the bore 86, for example, at point B. Thereafter, the armature member 90 pivots about the point B until the armature member strikes the valve seat 102. Finally, the armature member 90 will come to rest making surface contact with the valve seat 102 to close the bore 100 and prevent further flow of fluid through bore 100. It will be understood that at least the central portion of the upper surface of the armature member 90 and the bottom portion of the sleeve 98 comprising the valve seat 102 must be ground flat so as to provide a fluid-tight closure. If desired, the valve seat 102 may be formed separately from the sleeve 98 and pressed or otherwise attached to the sleeve 98.

Normally the pressure of the fluid within the bore 100 and the weight of the armature member 90 will be sufficient to insure opening of the solenoid valve when the electrical current in the solenoid coil is turned off. However, a light spring, preferably formed from a non-magnetic material may be installed to bias the armature member 90 away from the valve seat 102. Such an arrangement may also be used if it is desired to operate the solenoid valve in an inverted position.

A further modification is shown in FIG. 7 wherein the solenoid of the present invention is used to operate a plurality of valves. In this modification, the figure 118 designates a machine body made from a magnetic material such as iron or steel having formed therein a bore 120 which accommodates the solenoid assembly 122. A passageway 124 communicates between a source of fluid (not shown) and the bore 120. Bores 126 and 128 are formed in the machine body 118 and also communicate with the bore 120. Bore 130 communicates between the bore 126 and a first part of the machine body 118 requiring an intermittent supply of fluid while bore 132 communicates between bore 128 and a second part of the machine body 118 requiring an intermittent supply of fluid.

A ball valve 134 is positioned in the bore 126 and biased against a seat 136 by a light spring 138 seated in a plug 140 threaded into the bore 126. The ball valve 134 is shown in its closed position in solid lines while its open position is indicated by phantom lines.

A second ball valve 142 is positioned in the bore 128 and biased against a seat 144 by a light spring 146 seated in a plug 148 threaded into the bore 128. Again, the ball valve 142 is shown in its closed position by solid lines while the open position is indicated by phantom lines. A pin 150 is positioned in the bore 128 between the ball valve 142 and a pad 152 on the armature member 154 which is loosely or freely positioned within the bore 120. A second pad 156 may be formed on the armature member 154 to contact the ball valve 136. The pads 152 and 156 are, preferably, formed from a non-magnetic material. The armature member 154 is shown in its energized position by solid lines and in its unenergized position in phantom lines.

The solenoid assembly 122 comprises a cylindrical body portion 158 having a circumferential shoulder 160 adapted to carry an O-ring seal 162 which seals the solenoid body 158 against the machine body bore 120. The solenoid body 158 is affixed to a plate 164 formed from a magnetic material which plate is fastened to the machine body 118 by a plurality of screws 166. A core or sleeve 168 formed from a magnetic material is press fitted or otherwise fastened to the body 158 and the plate 164 so as to provide good magnetic contact with the plate 164. An axial bore 170 is formed in the sleeve 168 to locate a relatively heavy compression spring 172. Compression spring 172 is designed with a higher spring rate than the sum of the spring rates of springs 138 and 146 so that in the unenergized condition of the solenoid the armature member 154 will normally be positioned as shown in the phantom lines and the ball valves 134 and 142 will be open.

A solenoid coil 174 is located in the body 158 and sealed therein by appropriate potting material 176. One terminal 178 of the solenoid coil 174 may conveniently be grounded to the plate 164 while the other terminal 180 extends upwardly through the potting material 176.

In operation, upon passage of an electric current through the solenoid coil 174, a magnetic field will be established in the magnetic circuit which comprises the machine body 118, the plate 164, the sleeve 168 and the armature 154. The armature member 154 will first slide laterally to close the annular gap between it and the inner peripheral edge of the bore 120. Thereafter, the armature member 154 will pivot about the point of contact as previously described and finally come to rest against the lower side of the solenoid body 158. It will be understood that when the solenoid 174 is energized the armature 154 will be in the position shown by the solid lines in FIG. 7 and both ball valves 134 and 142 will function as check valves, remaining closed except when the fluid pressure in conduit 124 is sufficiently high to overcome the force of the springs 138 and 146. However, when the solenoid 174 is deenergized, high pressure fluid may flow from the conduits 130, 132 back through the ball valves 134, 142 and through the conduit 124 in a reverse direction until the pressure in the system is substantially equalized.

While separate pads 152, 156 have been described, it will be understood that a thin layer of non-magnetic material may be placed on the lower surface of the armature member 154. If the armature member 154 is disc shaped, it may be desirable to combine the pads 152, 156 into a single annulus or circular pad.

In FIG. 7, ball valve 142 is separated from the armature member 154 by the pin 150 while no similar pin is used in conjunction with ball valve 134. It will be understood that both valves may utilize either construction as may be desired. Moreover, more than two valves may be controlled by the solenoid assembly 122 provided that the spring rate of spring 172 exceeds the combined rate of the ball valve springs. Finally, while ball valves have been described and illustrated, other types of valves such as poppet valves, leaf valves or sliding or spool valves could be substituted for the ball valves.

The embodiment of the invention shown in FIG. 7 is particularly desirable for use in the operation of a compression relief engine brake of the type disclosed in U.S. Pat. No. 3,220,392, for example, where both a solenoid and a control valve are required and a high-speed but compact and reliable system is desired.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. An apparatus comprising a solenoid body member, a solenoid coil disposed within the outer region of said body member, a sleeve member formed from a magnetic material disposed within the central region of said body member, said sleeve member having a bore formed at least partially therethrough, means formed from a magnetic material having formed therein an armature chamber, said armature chamber having a first open end located adjacent a first end of said sleeve member, an armature member freely disposed within said armature chamber, and magnetic circuit means interconnecting said means having formed therein said armature chamber and a second end of said sleeve member.

2. An apparatus as described in claim 1 and including a layer of non-magnetic material located between the side of said armature member opposite said first open end of said armature chamber and the second end of said armature chamber.

3. An apparatus as described in claim 1 in which said sleeve member has a bore formed entirely therethrough and a valve seat extending circumferentially around said bore on said first end of said sleeve member whereby said armature and said valve seat on said sleeve member form a solenoid actuated valve to control the flow of fluids through said armature chamber.

4. An apparatus as described in claim 3 in which said armature chamber is cylindrical and said armature member is disc shaped.

5. An apparatus as described in claim 4 in which said magnetic circuit means comprises plate means affixed to said sleeve member and said means having formed therein an armature chamber.

6. An apparatus as described in claim 5 in which sealing means are interposed between said solenoid body member and said means having formed therein an armature chamber, said latter means including a passageway communicating with said armature chamber.

7. An apparatus as described in claim 1 in which the bore in said sleeve member extends only partially therethrough and biasing means are positioned in said bore whereby said armature means is biased away from said sleeve member.

8. An apparatus as described in claim 7 and including a layer of non-magnetic material located between the side of said armature member opposite said first open end of said armature chamber and the second end of said armature chamber.

9. An apparatus as described in claim 8 in which said magnetic circuit means comprises plate means affixed to said sleeve member and said means having formed therein an armature chamber.

10. An apparatus as described in claim 9 in which sealing means are interposed between said solenoid body member and said means having formed therein an armature chamber, said latter means including a passageway communicating with said armature chamber.

11. An apparatus as described in claim 8 including at least one valve means communicating with said armature chamber actuated by said armature, sealing means interposed between said solenoid body member and said means having formed therein an armature chamber, said latter means including a passageway communicating with said armature chamber.

12. An apparatus as described in claim 11 in which said armature chamber is cylindrical and said armature member is disc shaped.

13. An apparatus as described in claim 12 in which said magnetic circuit means comprises plate means affixed to said sleeve member and said means having formed therein an armature chamber.

14. An apparatus comprising a solenoid body made from a magnetic material, a coil positioned within said body, a sleeve having a bore formed therein and made from a magnetic material, said sleeve having magnetic contact with a portion of said body, a pin mounted for reciprocating motion within the bore of said sleeve, a cap formed from a magnetic material fastened to said body so as to have magnetic contact therewith, and an armature made from a magnetic material freely disposed within said cap and the upper ends of said sleeve and said pin.

15. An apparatus as described in claim 14 in which said pin is made from a non-magnetic material and including a layer of non-magnetic material disposed within said cap.

16. An apparatus as described in claim 15 in which said cap is annular in shape and said layer of non-magnetic material comprises an insert positioned in the inside surface of the top of said cap.

17. An apparatus as described in claim 14 in which said sleeve is positioned symmetrically about the axis of said coil and in which the bore of said sleeve is positioned on the axis of said sleeve.

18. An apparatus as described in claim 17 in which said pin is made from a non-magnetic material.

19. An apparatus as described in claim 18 in which said cap is annular in shape and including a layer of non-magnetic material disposed within said cap.

20. An apparatus as described in claim 14 in which said armature is disc-shaped.

21. An apparatus as described in claim 20 in which said pin is made from a non-magnetic material.

22. An apparatus as described in claim 21 in which said cap is annular in shape and including a layer of non-magnetic material disposed within said cap.

23. An apparatus as described in claim 22 in which said sleeve is positioned symmetrically about the axis of said coil and in which the bore of said sleeve is positioned on the axis of said sleeve.

24. An apparatus as described in claim 17 in which said armature is divided into two parts substantially along an axis of symmetry of said armature.

* * * * *